(No Model.)
C. M. JONES.
CAR COUPLING.
No. 371,073. Patented Oct. 4, 1887.
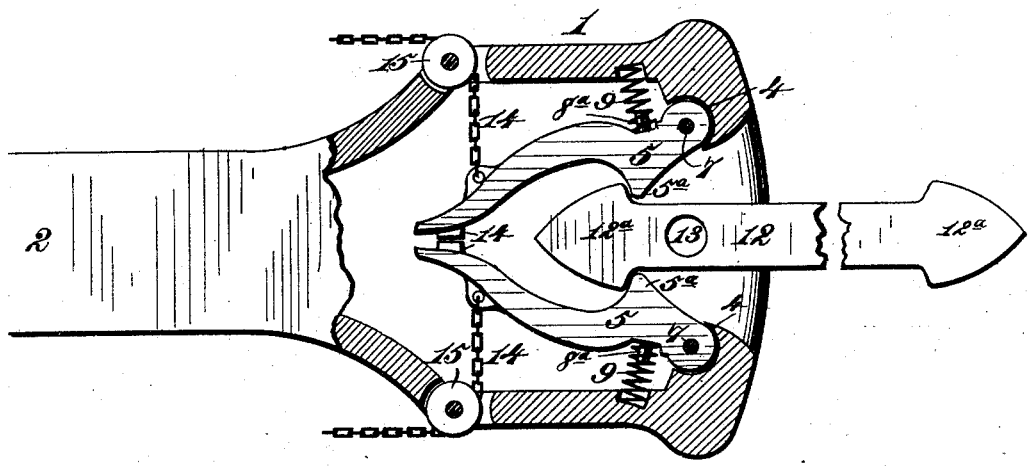
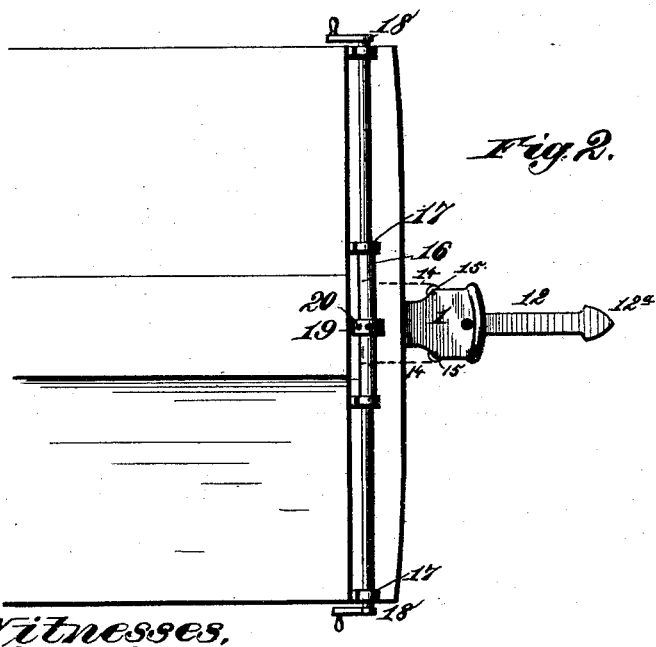
Witnesses,
Robt Everett,
Geo. W. Rea
Inventor:
Calvin M. Jones.
By James L. Norris.
Atty.

UNITED STATES PATENT OFFICE.

CALVIN M. JONES, OF FRESNO, ASSIGNOR OF ONE-HALF TO STEPHEN CLEVER BOOTH, OF SELMA, CALIFORNIA.

CAR-COUPLING.

SPECIFICATION forming part of Letters Patent No. 371,073, dated October 4, 1887.

Application filed May 3, 1887. Serial No. 237,001. (No model.)

*To all whom it may concern:*

Be it known that I, CALVIN M. JONES, a citizen of the United States, residing at Fresno, in the county of Fresno and State of California, have invented new and useful Improvements in Car-Couplings, of which the following is a specification.

The present invention relates to that class of car-couplings which are automatic in their operation and are provided with spring-pressed hooks and an arrow-headed coupling-link.

The invention consists in a novel construction and arrangement of parts, as hereinafter more fully set forth and claimed, whereby the coupling is effected as the cars are run together and the parts are readily coupled without going between the cars.

In the accompanying drawings, Figure 1 is a horizontal longitudinal section of a car-coupling embodying my improvement. Fig. 2 is a plan or top view of the same.

The reference-numeral 1 designates the draw-head or bumper formed with the draw-bar 2, which is connected with the car-frame in the ordinary manner. The draw-head or bumper is made of cast-iron and its external form does not differ from the ordinary bumper used upon freight or other cars. The draw-head is provided with curved recesses 4 at both sides of the mouth, and in these recesses a pair of hooked jaws, 5, are seated and pivotally connected with the draw-head by vertical pivot-pins 7. The jaws extend in a rearward direction and converge together at their rear or free ends, and they have hooks or noses 5ª, for the purpose of engaging with the coupling-link 12. The jaws are also curved or so shaped as to leave a heart-shaped space between the hooks 5ª and the converging or meeting ends, as is clearly indicated in Fig. 1.

To the outer sides of the jaws, at or near the pivot-points, are applied stems 8ª, which are encircled by spiral springs 9, arranged between the jaws and the side walls of the draw-head. The stems serve to hold the springs in place, and the tendency of the latter is to force the jaws toward each other. The coupling-link 12 is a straight bar having arrow-headed or pointed and shouldered ends 12ª of such a shape as to conform to the form of the hooks on the coupling-jaws. A vertical hole, 13, is formed through the coupling-bar for the reception of a pin when it is used in connection with an ordinary draw-head. The rear ends of the hooked jaws have cushion-blocks 14 on their adjoining faces, so as to prevent a too violent impact when the jaws are quickly closed by the action of the springs 9 upon the entrance of the coupling-link. Chains 14 are connected with the coupling-jaws at or near their rear ends and extend over guide-sheaves 15 in openings made in the sides of the draw-head, and from thence the chains are carried in a rearward direction and attached to a roller or windlass, 16. The latter is journaled in bearings or supports 17, extending from the car-frame, so that it can be rotated, for the purpose hereinafter stated. A crank or handle, 18, may be attached to one or both ends of the roller 16, and it also has a central hub, 19, provided with holes 20.

The operation is as follows: When a coupling-link carried by one car enters the mouth of the draw-head of an adjoining car, the jaws located in said draw-head are spread apart, so as to allow the arrow-head to pass in rear of the hooks on the jaws. The springs bearing upon the latter will serve to prevent the withdrawal or disengagement of the coupling-link, and by reason of the pivoting of the jaws at the front in the described manner it is evident that the rear ends of the hooked jaws will meet and abut each other when the draft-strain is on the hooks, thus providing strength and durability, besides avoiding the necessity of constructing the draw-heads with special seats to support the front sides of the hooked parts of the jaw, which latter construction unduly contracts the mouth of the draw-head and admits only a limited-sized coupling-bar. The coupling-link has a free movement in the enlarged space between the coupling-jaws, so as to allow for the turning of curves and other movements of the car. In order to effect the uncoupling from the top of the car, a bar or lever is inserted into the socket-hub on the windlass for the purpose of turning the latter and winding up the chains; or the same movement may be effected by the crank at the side of the car. It is evident that the winding up of the chains will open the jaws and allow the link to be released.

All the operations of coupling and uncoupling, it will be observed, can be performed without the necessity of the brakeman going between the cars, and hence the occurrence of accidents can be prevented.

Having thus described my invention, what I claim is—

1. In a car-coupling, the combination of the draw-head having side openings, the guide-sheaves at or adjacent to said side openings, the hooked spring-pressed jaws pivoted at their front ends and converging together at their rear ends, which abut when the draft-strain is on the hooks, and chains extending from the jaws over the sheaves for drawing said converging ends of the jaws apart, substantially as described.

2. A car-coupling consisting of a draw-head containing spring-pressed hooked jaws pivoted at their forward ends and converging together at their rear ends, which meet and abut each other to resist strain when the draft is on the hooked jaws, substantially as described.

3. In a car-coupling, the combination, with the draw-head, of the hooked spring-pressed jaws pivoted at their front ends and converging at their rear ends, the chains, and the windlass, substantially as described.

In testimony whereof I affix my signature in presence of two witnesses.

CALVIN M. JONES.

Witnesses:
E. E. CALHOUN,
F. H. SHORT.